(12) United States Patent
Schroeder et al.

(10) Patent No.: US 10,778,073 B2
(45) Date of Patent: Sep. 15, 2020

(54) AUTOMOTIVE AUXILIARY DEVICE WITH ELECTRIC DRIVE MOTOR

(71) Applicant: PIERBURG PUMP TECHNOLOGY GMBH, Neuss (DE)

(72) Inventors: Viktor Schroeder, Leghorn (IT); Andreas Wulf, Duesseldorf (DE); Frank Buerger, Langerwehe (DE); Alessandro Malvasi, Leghorn (IT)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 51 days.

(21) Appl. No.: 15/756,586

(22) PCT Filed: Sep. 4, 2015

(86) PCT No.: PCT/EP2015/070219
§ 371 (c)(1),
(2) Date: Mar. 1, 2018

(87) PCT Pub. No.: WO2017/036549
PCT Pub. Date: Mar. 9, 2017

(65) Prior Publication Data
US 2018/0183309 A1 Jun. 28, 2018

(51) Int. Cl.
*H02K 29/08* (2006.01)
*H02K 7/08* (2006.01)
(Continued)

(52) U.S. Cl.
CPC ............ *H02K 29/08* (2013.01); *B62D 5/064* (2013.01); *H02K 5/04* (2013.01); *H02K 7/083* (2013.01); *H02K 11/33* (2016.01); *H02K 11/215* (2016.01)

(58) Field of Classification Search
CPC .......... H02K 29/08; H02K 7/083; H02K 5/04; H02K 11/33; H02K 11/215; B62D 5/064
(Continued)

(56) References Cited

U.S. PATENT DOCUMENTS

| | | | |
|---|---|---|---|
| 3,805,134 A | 4/1974 | Osamu et al. | |
| 4,471,246 A * | 9/1984 | Paillet | H02K 21/14 29/596 |

(Continued)

FOREIGN PATENT DOCUMENTS

| | | |
|---|---|---|
| DE | 43 07 337 A1 | 9/1994 |
| EP | 1 146 625 A2 | 10/2001 |

(Continued)

*Primary Examiner* — John K Kim
(74) *Attorney, Agent, or Firm* — Norman B. Thot

(57) ABSTRACT

An automotive auxiliary device includes an electric drive motor which is brushless and electronically commutated. The electric drive motor includes a rotatable motor rotor which defines a longitudinal rotor axis, a motor stator, and at least one stator-sided hall-sensor. The motor rotor includes a rotor shaft, a magnet carrier, and at least one permanent magnet which generates at least two rotor poles. The permanent magnet is fixed to the magnet carrier to provide a free inner space between the rotor shaft and the permanent magnet. The permanent magnet includes an axial protruding portion which axially protrudes from at least one side of the magnet carrier. The motor stator comprises at least two stator coils which are arranged radially around the rotatable motor rotor. The hall-sensor is arranged in the free inner space and is provided as a type of radial rotor detection sensor.

9 Claims, 2 Drawing Sheets

(51) Int. Cl.
    *H02K 5/04* (2006.01)
    *B62D 5/06* (2006.01)
    *H02K 11/21* (2016.01)
    *H02K 11/33* (2016.01)
    *H02K 11/215* (2016.01)

(58) Field of Classification Search
    USPC .................. 310/68 B, 90, 156.06, 156.12
    See application file for complete search history.

(56) References Cited

U.S. PATENT DOCUMENTS

| | | | | |
|---|---|---|---|---|
| 4,482,829 | A * | 11/1984 | Tardieu | H02K 5/15 310/105 |
| 6,225,715 | B1 * | 5/2001 | Hoda | H02K 5/15 310/67 R |
| 7,679,244 | B2 * | 3/2010 | Agematsu | H02K 5/1672 310/216.001 |
| 8,653,707 | B2 * | 2/2014 | Furukawa | H02K 1/278 310/68 B |
| 2001/0033113 | A1 | 10/2001 | Takano | |
| 2006/0181168 | A1 * | 8/2006 | Hargraves | F04B 17/03 310/90 |
| 2007/0046122 | A1 * | 3/2007 | Makiuchi | H02K 29/08 310/156.05 |
| 2007/0145850 | A1 * | 6/2007 | Hsu | H02K 21/046 310/156.56 |
| 2007/0182265 | A1 * | 8/2007 | Makino | H02K 3/522 310/179 |
| 2007/0216243 | A1 * | 9/2007 | Agematsu | H02K 7/083 310/90 |
| 2008/0061638 | A1 * | 3/2008 | Lulic | F04D 13/026 310/62 |
| 2011/0067945 | A1 * | 3/2011 | Sonoda | B62D 5/0406 180/444 |
| 2012/0043862 | A1 * | 2/2012 | Furukawa | H02K 1/30 310/68 B |
| 2013/0088127 | A1 * | 4/2013 | Ogawa | H02K 24/00 310/68 B |
| 2014/0145564 | A1 * | 5/2014 | Taniguchi | H02K 3/12 310/68 B |
| 2014/0159551 | A1 * | 6/2014 | Aso | H02K 7/083 310/68 B |
| 2015/0076972 | A1 * | 3/2015 | Leiber | B60T 13/741 310/68 B |
| 2015/0295458 | A1 * | 10/2015 | Yamada | H02K 1/243 310/156.66 |
| 2016/0094110 | A1 * | 3/2016 | Drye | H02K 5/15 310/68 B |
| 2018/0183309 | A1 * | 6/2018 | Schroeder | H02K 29/08 |

FOREIGN PATENT DOCUMENTS

| | | |
|---|---|---|
| JP | 60-135070 U | 9/1985 |
| JP | 8-322 U | 2/1996 |
| JP | 2001-298903 A | 10/2001 |
| JP | 2004-23905 A | 1/2004 |
| JP | 2007-252039 A | 9/2007 |

* cited by examiner

AUTOMOTIVE AUXILIARY DEVICE WITH ELECTRIC DRIVE MOTOR

CROSS REFERENCE TO PRIOR APPLICATIONS

This application is a U.S. National Phase application under 35 U.S.C. § 371 of International Application No. PCT/EP2015/070219, filed on Sep. 4, 2015. The International Application was published in English on Mar. 9, 2017 as WO 2017/036549 A1 under PCT Article 21(2).

FIELD

The present invention relates to an automotive auxiliary device, for example, an electric fluid pump, with a brushless electronically commutated drive motor, the drive motor comprising a motor rotor, a motor stator, and at least one hall-sensor for a precise detection of the rotational rotor position.

BACKGROUND

The precise detection of the rotational rotor position of the motor rotor is important for a secure and energy-efficient operation of an automotive auxiliary device, which is driven by an electronically commutated drive motor, since only in this way can an exact control and regulation of the drive motor be realized. The precise detection helps to avoid undesired operations, such as start-up problems, for example, so-called toggling, or other operational problems which can in particular occur with positive displacement pumps due to greatly varying torques. The precise detection also facilitates an accurate timing of the commutation in the stator coils so that the absolute energy consumption can be minimized.

Against this background, hall-sensors are commonly used to provide an accurate rotor position detection. The hall-sensors can be arranged axially or radially to the motor rotor which is magnetically excited by permanent magnets. The hall-sensors thereby detect rotating magnetic fields of the motor rotor generated by the permanent magnets and their magnetic poles, respectively.

The absolute field strength of the magnetic field and the size of interfering signals are crucial for the accuracy of the rotor position detection by hall-sensors.

SUMMARY

An aspect of the present invention is to provide an automotive electric fluid pump with an electric drive motor which has a high operational reliability and energy efficiency at low manufacturing costs.

In an embodiment, the present invention provides an automotive auxiliary device which includes an electric drive motor which is brushless and electronically commutated. The electric drive motor comprises a rotatable motor rotor which defines a longitudinal rotor axis, a motor stator, and at least one stator-sided hall-sensor. The rotatable motor rotor comprises a rotor shaft, a magnet carrier, and at least one permanent magnet which is configured to generate at least two rotor poles. The at least one permanent magnet is fixed to the magnet carrier so as to provide a free inner space between the rotor shaft and the at least one permanent magnet. The at least one permanent magnet comprises an axial protruding portion which is arranged to axially protrude from at least one side of the magnet carrier. The motor stator comprises at least two stator coils which are arranged radially around the rotatable motor rotor. The at least one stator-sided hall-sensor is arranged in the free inner space. The at least one stator-sided hall sensor is provided as a type of radial rotor detection sensor.

BRIEF DESCRIPTION OF THE DRAWINGS

The present invention is described in greater detail below on the basis of embodiments and of the drawings in which.

DETAILED DESCRIPTION

Figure 1:
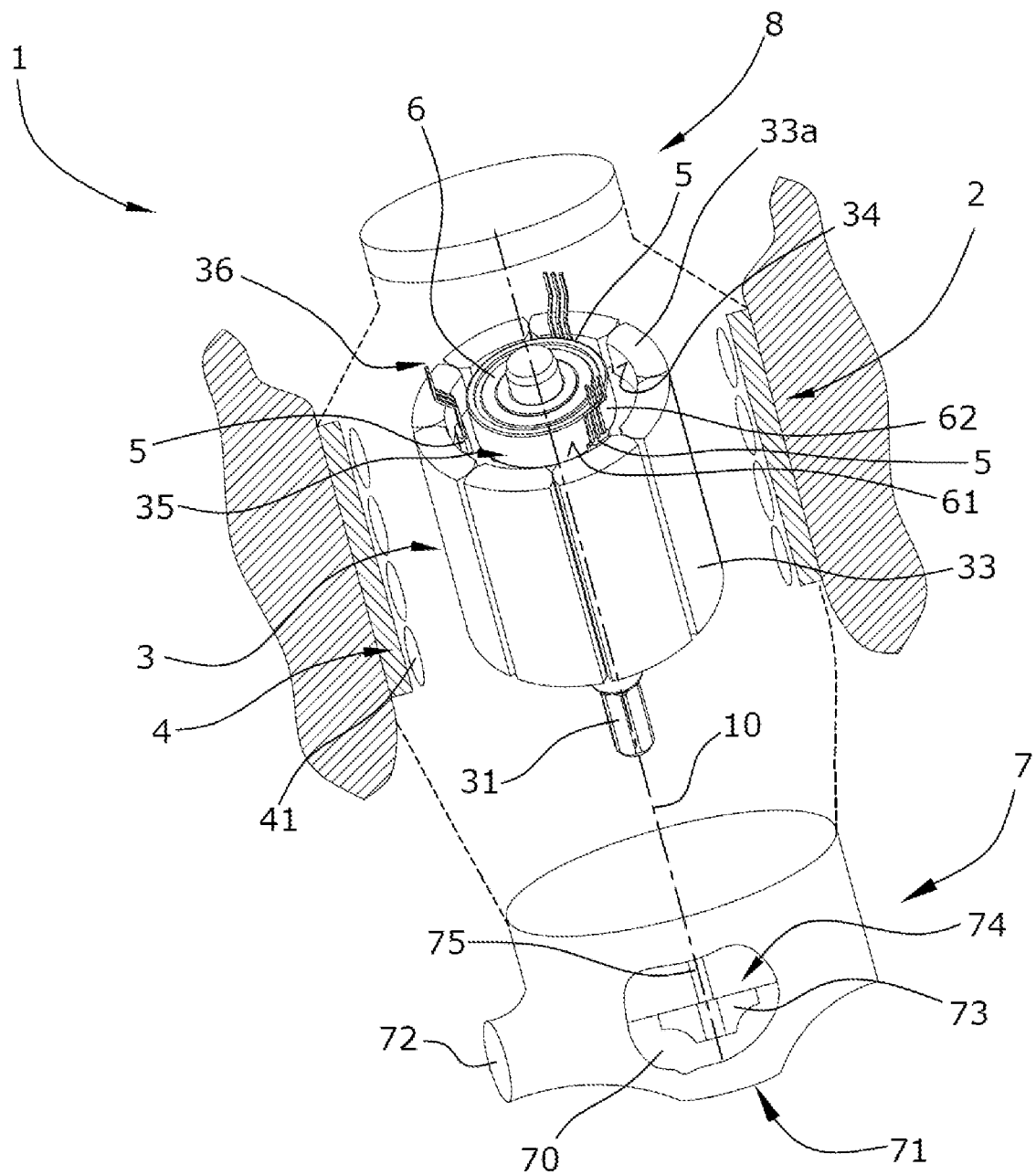
FIG. 1 schematically shows a perspective view of an automotive auxiliary device with an electric drive motor.

The automotive auxiliary device of the present invention, in particular an electric fluid pump comprising a pumping part with an electrically driven impeller provided in a fluid channel, and a motor part with an electric drive motor, in particular comprises a brushless and electronically commutated drive motor. The drive motor comprises a motor rotor, a motor stator, and at least one hall-sensor detecting the rotational position of the motor rotor. The number of hall-sensors in particular depends on the quantity of the motor phases. The motor rotor comprises a rotatable rotor shaft which defines the longitudinal axis of the pump and which extends at least over the whole length of the motor rotor. In order to drive an impeller or an actuator, the rotor shaft can, of course, extend from the motor part to a pumping part or actuating part. The motor rotor further comprises a magnet carrier which is fixed to the motor shaft and which carries at least one permanent magnet, for example, on a radial outside of the magnet carrier. The permanent magnet can be ring-shaped and has an axial protruding portion which axially protrudes from at least one distal end of the magnet carrier. The permanent magnet can be but does not need to be made axially longer than the magnet carrier therefor. The permanent magnet generates at least two rotor poles so that a rotatable magnetic field is provided to the motor rotor. The motor stator is arranged radially around the motor rotor and comprises at least two stator coils. The coils can be energized with electricity controlled by a power electronics. The power electronics can, for example, be provided at the distal end of the motor rotor opposite to the pumping part. The power electronics is provided with at least one stator-sided hall-sensor. The hall-sensor is a radial rotor detection sensor detecting radial magnetic fields of the rotor poles and is thus arranged radially to the permanent magnet of the motor rotor. The hall-sensor is in particular arranged at the radial inner side of the permanent magnet in a free space between the rotatable rotor shaft and the permanent magnet. This free space and area, are, for example, respectively located at the radial inner side of the protruding portion of the permanent magnet which axially protrudes from the distal end of the magnet carrier. This feature leads to an increased sensitivity of the radial rotor position detection by the hall-sensor. Misalignments between a rotor magnetic field and a sensor magnetic field as well as influences by the stator magnetic field can therefore be excluded so that the signals of the hall-sensor can be improved. This arrangement also provides a space-saving construction, a high operational reliability, and a high energy efficiency at low manufacturing costs.

In an embodiment of the present invention, the hall-sensor can, for example, be arranged next to a radial inner surface of the permanent magnet. This feature leads to a radial inner periphery of the permanent magnet which can be round-shaped coaxially to the rotor axis with an increased total surface. This radial inner periphery can, for example, at least be provided in that part of the permanent magnet which axially protrudes from the distal end of the magnet carrier. The hall-sensor can therefore be arranged very close to the permanent magnet so that the rotor position detection can be significantly improved.

The hall-sensor can be arranged eccentrically to the rotor axis in a transversal plane. This transversal plane can, for example, be axially located in the section where the protruding part of the permanent magnet is arranged. The hall-sensors can be spaced from one another, for example, in a circumferential angle of approximately 120°. The hall-sensor can thus be mounted facing the radial inner periphery of the permanent magnet in a relatively simple way. If the drive motor is provided with more than one hall-sensor, the hall-sensors can, for example, be arranged concentrically to the rotor axis in the transversal plane. This also results in a very accurate detection of the rotor position.

In an embodiment of the present invention, the hall-sensor can, for example, be provided at an axially distal end of the motor rotor, in particular at an axially distal end of the magnet carrier. This distal end of the motor rotor can, for example, be arranged opposite to an actuating part or a pumping part of a pump. The hall-sensor can be arranged very close to the power electronics in this embodiment so that the manufacturing costs can be reduced.

In an embodiment of the present invention, the hall-sensor can, for example, be fixed to or integrated into a ring-shaped sensor carrier. The sensor carrier can be made of plastic material so that the hall-sensor can be easily fixed to or integrated into the sensor carrier. The sensor carrier itself can be fixed by at least one stator-side bracket or arm. This embodiment results in very low manufacturing costs.

In an embodiment of the present invention, the motor rotor can, for example, be provided with a ferromagnetic part which is made of a ferromagnetic material and which is arranged radially between the rotor axis and the hall-sensor. The ferromagnetic part is in particular arranged between the rotor shaft and the hall-sensor. An effect of the ferromagnetic part is that the orientation of a magnetic flux generated by the permanent magnet can be orientated, in particular the magnetic flux angle through the hall-sensor can be improved, for example, to be perfectly radial, so that a high detecting performance is provided.

The ferromagnetic part can be part of the rotor shaft, for example, a shaft shoulder, or can be a separate part fixed to the motor rotor, for example, to the rotor shaft. Manufacturing costs can be significantly reduced in the case of a ferromagnetic part being part of the rotor shaft. In the case of a ferromagnetic part being a separate part fixed to the motor rotor, the ferromagnetic part can be installed individually depending on a specific pump charge or other individual requirements.

The ferromagnetic part can be realized as a solid ring or as a rotor-shaft bearing, for example, a ball-bearing supporting the rotor shaft. This kind of arrangement results in a space-saving construction of the motor.

In an embodiment of the present invention, the ferromagnetic part can, for example, be provided with a radial outer periphery facing the hall-sensor. This arrangement provides that the magnetic flux angle through the hall-sensor can be substantially radial so that misalignments between a rotor magnetic field and a sensor magnetic field as well as influences by the stator magnetic field can be excluded, and the signals of the hall-sensor can be improved.

In an embodiment of the present invention, at least the ferromagnetic part and the permanent magnet can, for example, create a circumferential groove or channel in which the hall-sensor is provided. The channel is open on one axial side so that the hall-sensor can be inserted in one side of the channel. This embodiment provides a low cost manufacturing and a high detection quality.

In an embodiment of the present invention, the ferromagnetic part, the permanent magnet, and the hall-sensor can, for example, be arranged so that the magnetic flux through the hall-sensor is substantially radially orientated. The magnetic flux from the permanent magnet through the hall-sensor into the ferromagnetic part is in particular orientated substantially radially. This feature leads to an increased sensitivity of the radial rotor position detection by the hall-sensor.

In an embodiment of the present invention, the magnet carrier can, for example, be a rotor stack. This feature results in a space-saving construction of the motor.

In an embodiment of the present invention, the permanent magnets can, for example, be fixed to a radial outside of the rotor carrier, for example, to the rotor stack. This feature also results in a space-saving construction of the motor.

A description of an embodiment of the present invention is described with reference to the drawings.

Both drawings schematically show an automotive auxiliary device which is realized as an automotive electric fluid pump 1. The fluid pump 1 is configured as a liquid flow pump, for example, as a coolant pump or as a fuel pump. The fluid pump 1 can alternatively also be designed and provided as a positive displacement pump, a gerotor pump, a vane pump, or as another rotating displacement pump, for example, for pumping a lubricant for lubrication of an internal combustion engine.

The fuel pump 1 is provided with three sections, i.e., a pump section 7, a motor section, and an electronics section 8.

The pump section 7 is provided with a flow channel 70 comprising an axial inlet 71 and a tangential outlet 72, and with a pump rotor 74 comprising a pump rotor shaft 75 and an impeller wheel 73, which is only schematically shown in an outbreak in the drawings. In order to drive the pump rotor 74 and the impeller wheel 73, respectively, the pump rotor shaft 75 is connected with the drive motor 2 of the motor section, respectively.

The motor section is provided with an electric drive motor 2, which is a brushless DC motor and comprises at least a motor rotor 3 and a motor stator 4. The electronics section 8 comprises several electronic parts in order to control the drive motor 2.

The motor rotor 3 is defined by a rotatable motor rotor body comprising at least a motor rotor shaft 31, a magnet carrier 32, and several permanent magnets 33. The motor rotor shaft 31 is rotatably connected with the pump rotor shaft 75 and defines a longitudinal rotor axis 10 of the fluid pump 1. The magnet carrier 32 of the motor rotor 3 is fixed to the motor rotor shaft 75 and carries the permanent magnets 33 on a radial outside of the magnet carrier 32. The permanent magnets 33 are longer than the magnet carrier 32 and have an axial protruding portion 33a which axially protrudes from an axially distal end 32a of the magnet carrier 32. An inner free space 35 is thus provided between the longitudinal rotor axis 10 and the permanent magnets 33, in particular between a rotor bearing 62 and the permanent magnets 33. The rotor bearing 62 defines a ferromagnetic part 6 which is made of ferromagnetic material and can thus cause a radial orientation of a magnetic flux from the permanent magnets 33 to the ferromagnetic part 6, i.e., to the rotor bearing 62.

Because the drive motor 2 is designed as a brushless DC motor which is electronically commutated by motor control electronics, the motor rotor 3 is permanently magnetized by the permanent magnets 33 generating at least two rotor poles. The magnetized motor rotor 3 can be magnetically driven by the motor stator 4 which is defined by a number of motor stator coils 41. The motor stator coils 41 are arranged radially around the motor rotor 3 and generate a rotating magnetic field which is followed by the magnetized motor rotor 3. In order to generate the rotating magnetic field, the motor stator coils 41 can be selectively energized by power electronics such as semiconductors which are provided in the electronics section 8 (which are not shown in detail in the drawings). The power electronics is provided at the distal end 36 of the motor rotor 3 opposite to the pump section 7. In order to control the rotor rotation, the electronics section 8 further comprises three hall-sensors 5 detecting the precise rotational position of the motor rotor 3.

The hall-sensors 5 are radial rotor detection sensors detecting radial magnetic fields of the rotor poles and are thus arranged radially to the permanent magnets 33 of the motor rotor 3. The hall-sensors 5 are in particular provided at the axially distal end 32a of the magnet carrier 32, in an area radially between the rotatable rotor bearing 62 and the permanent magnets 33, i.e., in the above-mentioned inner free space 35. In other words, the axially protruding portion 33a of the permanent magnets 33 radially surrounds the hall-sensors 5. This feature leads to an increased sensitivity of the radial rotor position detection by the hall-sensors 5 and to a space-saving construction of the fluid pump 1. The hall-sensors 5 are arranged eccentrically and concentrically to the longitudinal rotor axis 10 in a transversal plane and are spaced from one another in a circumferential angle of 120°. The hall-sensors 5 are fixed to a sensor carrier 51 which is provided as a ring-shaped body. The sensor carrier 51 can be fixed via an arm or bracket 53 to the motor stator 4.

In order to further increase the sensitivity of the radial rotor position detection by the hall-sensors 5, the rotor bearing 62 is, as mentioned above, designed as a a ferromagnetic part 6 so that the magnetic flux angle from the permanent magnets 33 through the hall-sensor 5 into the rotor bearing 62 can be substantially radial and misalignments between a rotor magnetic field and a sensor magnetic field as well as influences by the stator magnetic field can be excluded.

Figure 2:
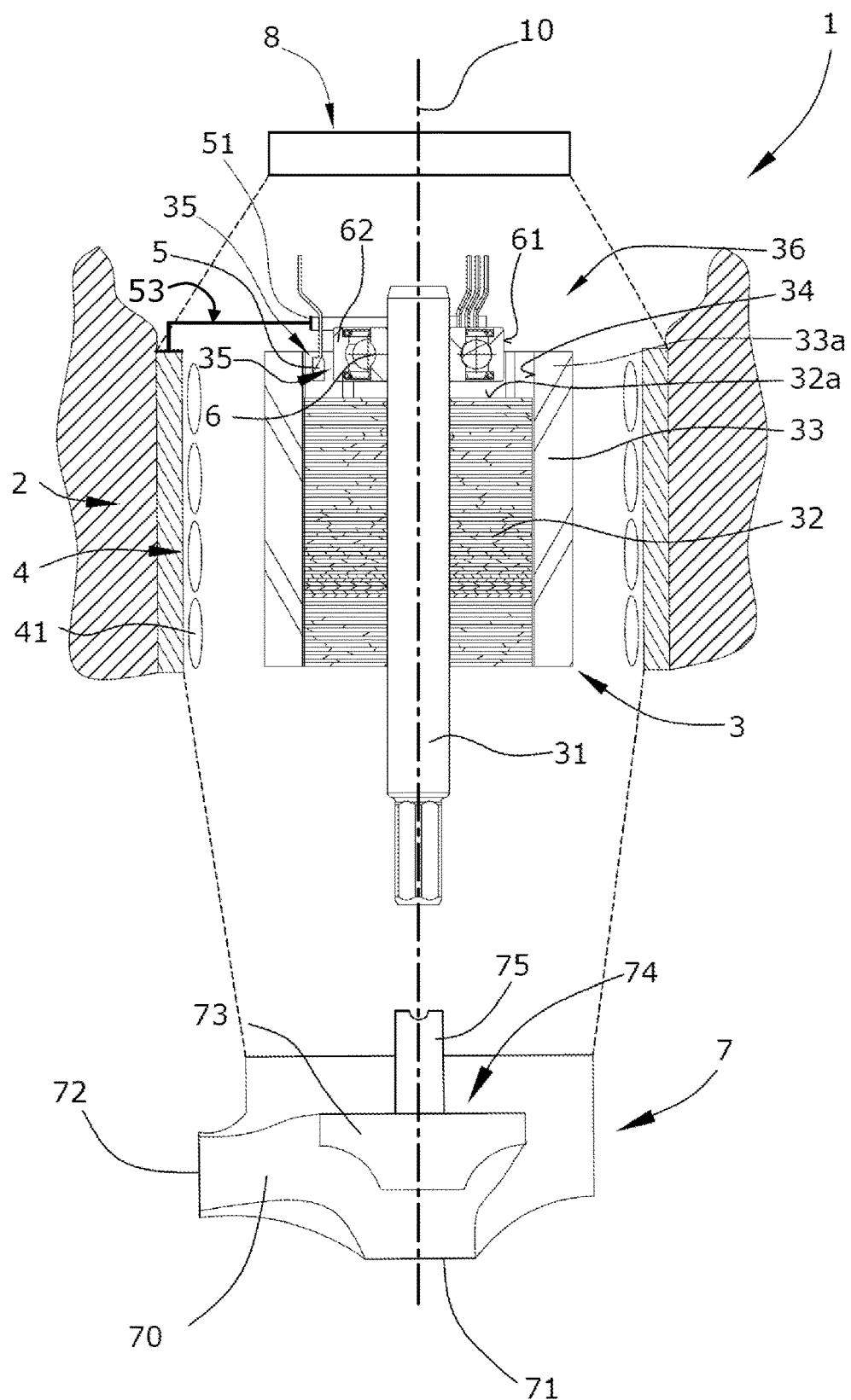
FIG. 2 schematically shows a cross section of the automotive auxiliary device, in particular, of the electric drive motor of FIG. 1.

It should be noted that FIGS. 1 and 2 only show an example of an application of the automotive auxiliary device. The automotive auxiliary device can also be realized as a device for other components, such as an engine gas recirculation (EGR), throttle valve, etc.

The present invention is not limited to embodiments described herein; reference should be had to the appended claims.

LIST OF REFERENCE NUMERALS 1 automotive electric fluid pump
10 longitudinal rotor axis
2 drive motor
3 motor rotor
31 motor rotor shaft
32 magnet carrier
32a axially distal end (of magnet carrier)
33 permanent magnet
33a axial protruding portion
34 radial inner surface (of permanent magnet)
35 inner free space/ring-shaped groove
36 distal end (of motor rotor)
4 motor stator
41 motor stator coils
5 hall-sensor
51 sensor carrier
53 Bracket
6 ferromagnetic part
61 radial outer periphery (of ferromagnetic part)
62 rotor bearing
7 pump section
70 flow channel
71 axial inlet
72 tangential outlet
73 impeller wheel
74 pump rotor
75 pump rotor shaft
8 electronics section

What is claimed is:

1. An automotive auxiliary device comprising,
an electric drive motor configured to be brushless and electronically commutated, the electric drive motor comprising:
a sensor carrier, and
a rotatable motor rotor defining a longitudinal rotor axis, the rotatable motor rotor comprising a rotor shaft, a magnet carrier, and at least one permanent magnet which is configured to generate at least two rotor poles, the at least one permanent magnet being fixed to the magnet carrier so as to provide a free inner space between the rotor shaft and the at least one permanent magnet, the at least one permanent magnet comprising an axial protruding portion which is arranged to axially protrude from at least one side of the magnet carrier;
a motor stator comprising at least two stator coils which are arranged radially around the rotatable motor rotor; and
at least one hall-sensor arranged in the free inner space, the at least one hall-sensor being fixed to the sensor carrier which is fixed via a bracket to the motor stator, the at least one hall-sensor being provided as a type of radial rotor detection sensor,
wherein,
the rotatable motor rotor further comprises a ferromagnetic part arranged radially between the longitudinal rotor axis and the at least one hall-sensor, and
the ferromagnetic part is a rotor-shaft bearing.

2. The automotive auxiliary device as recited in claim 1, wherein,
the at least one permanent magnet further comprises a radial inner surface, and
the at least one hall-sensor is arranged next to the radial inner surface of the at least one permanent magnet.

3. The automotive auxiliary device as recited in claim 1, wherein the at least one hall-sensor is arranged eccentrically to the longitudinal rotor axis.

4. The automotive auxiliary device as recited in claim 1, wherein,
the rotatable motor rotor comprises a distal end, and
the at least one hall-sensor is arranged towards the distal end of the rotatable motor rotor.

5. The automotive auxiliary device as recited in claim 1, wherein the ferromagnetic part is provided as a shoulder of the rotor shaft or as a separate part fixed to the rotatable motor rotor.

6. The automotive auxiliary device as recited in claim 1, wherein,
- at least the ferromagnetic part and the at least one permanent magnet provide a ring-shaped groove or channel as the free inner space which is configured to be axially open on one-side, and
- at least one hall-sensor is arranged in the ring-shaped groove or channel.

7. The automotive auxiliary device as recited in claim 1, wherein,
- the ferromagnetic part, the at least one permanent magnet, and the at least one hall-sensor are arranged so that a magnetic flux through the at least one hall-sensor is orientated substantially radially.

8. The automotive auxiliary device as recited in claim 1, wherein the magnet carrier is a rotor stack.

9. The automotive auxiliary device as recited in claim 1, wherein,
- the magnet carrier comprises a radial outside, and
- the at least one permanent magnet is fixed to the radial outside of the magnet carrier.

* * * * *